United States Patent
Blaya et al.

(10) Patent No.: US 12,032,905 B2
(45) Date of Patent: Jul. 9, 2024

(54) METHODS AND SYSTEMS FOR SUMMARIZATION OF MULTIPLE DOCUMENTS USING A MACHINE LEARNING APPROACH

(71) Applicant: AMADEUS S.A.S., Biot (FR)

(72) Inventors: Christophe Blaya, La Roquette sur Siagne (FR); Srudeep Kumar Reddy Katamreddy, Antibes (FR); Bernard Jean Marie Rannou, Cannes (FR); Bastien Dechamps, Malakoff (FR)

(73) Assignee: AMADEUS S.A.S., Biot (FR)

( * ) Notice: Subject to any disclaimer, the term of this patent is extended or adjusted under 35 U.S.C. 154(b) by 128 days.

(21) Appl. No.: 17/072,340

(22) Filed: Oct. 16, 2020

(65) Prior Publication Data

US 2021/0117617 A1    Apr. 22, 2021

(30) Foreign Application Priority Data

Oct. 17, 2019  (FR) ...................... 1911579

(51) Int. Cl.
*G06F 40/211*    (2020.01)
*G06F 40/253*    (2020.01)
(Continued)

(52) U.S. Cl.
CPC .......... *G06F 40/211* (2020.01); *G06F 40/253* (2020.01); *G06F 40/284* (2020.01); *G06F 40/40* (2020.01); *G06N 20/00* (2019.01)

(58) Field of Classification Search
CPC .... G06F 40/211; G06F 40/253; G06F 40/284; G06F 40/40; G06F 40/30; G06F 16/345; G06N 20/00
See application file for complete search history.

(56) References Cited

U.S. PATENT DOCUMENTS 7,389,225 B1 *   6/2008   Jensen .................... G06F 40/30
                                                       704/4
10,410,224 B1 *  9/2019   Levanon ................ G06Q 30/02
(Continued)

FOREIGN PATENT DOCUMENTS

CN    107729403 A  *  2/2018
EP      0952533 A2    10/1999
(Continued)

OTHER PUBLICATIONS

Kogilavani, S. V., R. Thangarajan, and CS Kanimozhiselvi3 Dr S. Malliga. "Detecting Paraphrases in Tamil Language Sentences." (2017).; https://www.irjet.net/archives/V4/15/IRJET-V41588.pdf (Year: 2017).*

(Continued)

*Primary Examiner* — Pierre Louis Desir
*Assistant Examiner* — Keisha Y. Castillo-Torres
(74) *Attorney, Agent, or Firm* — Perry + Currier Inc.

(57) ABSTRACT

An abstractive technique and an extractive technique are used to generate concise natural-language summaries of related text documents. The abstractive step generates a machine summary by constructing a graph with nodes representing unique pairs of tokens and corresponding parts-of-speech (POS), and with edge sequences representing token/POS pairs comprising sentences of a corresponding topic group from the text documents. Ranked candidate summary sentences are generated using subgraphs of the graph having initial and final nodes corresponding with valid sentence start and end pairs. The machine summary includes representative summary sentence(s) selected from each topic group's ranked candidates. The extractive step generates a natural-language summary from the machine summary by computing, for each topic group, numerical suitability measures providing comparisons between the (Continued)

representative summary sentence and sentences of the topic group. The natural-language summary is composed by selecting, for each topic group, a preferred summary sentence based on the numerical suitability measures.

14 Claims, 7 Drawing Sheets

(51) Int. Cl.
   *G06F 40/284* (2020.01)
   *G06F 40/40* (2020.01)
   *G06N 20/00* (2019.01)

(56) References Cited

U.S. PATENT DOCUMENTS

| | | | | |
|---|---|---|---|---|
| 2002/0052901 | A1* | 5/2002 | Guo | G06F 40/20 |
| | | | | 707/E17.094 |
| 2004/0117736 | A1* | 6/2004 | Newman | G06Q 10/107 |
| | | | | 715/229 |
| 2008/0154848 | A1* | 6/2008 | Haslam | G06F 16/382 |
| 2016/0232157 | A1* | 8/2016 | Mansour | G06F 16/3334 |
| 2018/0232443 | A1* | 8/2018 | Delgo | G06F 16/35 |
| 2018/0365323 | A1* | 12/2018 | Doornenbal | G06F 16/9535 |
| 2019/0197184 | A1* | 6/2019 | Srinivasan | G06F 16/338 |
| 2020/0073950 | A1* | 3/2020 | Ruan | G06F 16/3332 |

FOREIGN PATENT DOCUMENTS

| | | |
|---|---|---|
| WO | WO-2013185856 A1 | 12/2013 |
| WO | WO-2018214486 A1 | 11/2018 |

OTHER PUBLICATIONS

Filippova, Katja. "Multi-sentence compression: Finding shortest paths in word graphs." Proceedings of the 23rd international conference on computational linguistics, Jan. 1, 2010, pp. 322-330. URL: https://www.aclweb.org/anthology/C10-1037.pdf.

* cited by examiner

426

```
Data: Set of POS tagged sentences S = {s_1, ..., s_n}
G ← Empty directed graph
for s_i ∈ S do
    SID ← i
    for w_j ∈ s_i do
        PID ← PID(w_j, s_i)
        if w_j ∈ G then
            PRI(w_j) ← PRI(w_j) ∪ {SID : PID}
        end
        else
            Create node w_j in G
            PRI(w_j) ← {SID : PID}
        end
        if not exists edge w_{j-1} → w_j then
            Create directed edge between w_{j-1} and w_j
        end
    end
end
```

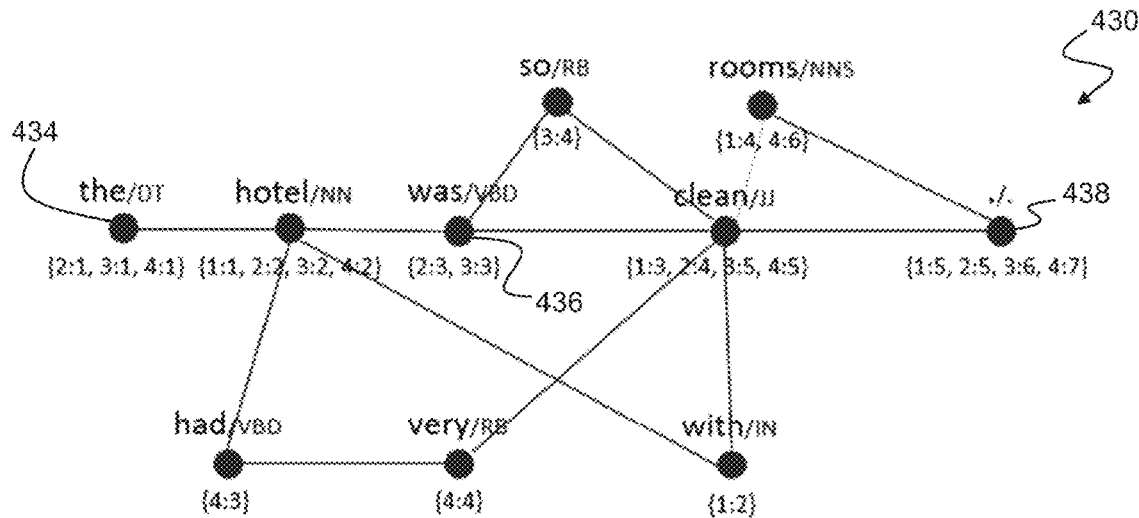

1. Hotel with clean rooms.
2. The hotel was clean.
3. The hotel was so clean.
4. The hotel had very clean rooms.

METHODS AND SYSTEMS FOR SUMMARIZATION OF MULTIPLE DOCUMENTS USING A MACHINE LEARNING APPROACH

CROSS-REFERENCE TO RELATED APPLICATIONS

This application claims priority from French patent application no. 1911579, filed Oct. 17, 2019, the contents of which is incorporated herein by reference.

FIELD

The invention relates to automatic text summarization, and in particular to improved methods and systems that employ a machine learning approach to provide concise, natural-language summaries of multiple documents.

BACKGROUND

With the growth of information systems, the Internet, and the World Wide Web, documents in digital form have become pervasive. It is now possible for users throughout the world to access large numbers of documents containing vast quantities of information with relative ease. As a consequence, however, users may be required to review many documents in order to find information that is relevant to their needs. Additionally, documents may be accessed and viewed on many kinds of devices (e.g. desktop and mobile computers, tablet devices, smartphones and other hand-held computing devices, smart watches, etc.) having a variety of display formats from large to very small, Documents that are easily viewed on large displays become unmanageable on small ones. In some cases, users may wish to access documents via non-visual interfaces, such as a text-to-speech interface, either by choice (e.g. when exercising or operating a vehicle) or need (e.g. due to visual impairment). In all of these scenarios, it may be undesirable and/or impractical for the user to review the full text of multiple documents in order to access information of interest.

Automatic summarization may be used to address the need to present information contained in text documents in a reduced form that is more suitable for users with time constraints, smaller format display devices, and/or who rely upon the use of non-visual interfaces. Automatic summarization is the process of reducing one or more text documents to a shorter text document that retains salient information content of the documents. It can therefore be a useful tool for providing information about document contents in a concise form, without requiring a user to read, or otherwise review, large volumes of text that may be contained in the original documents.

For example, European patent no. EP 0 952 533, granted on 14 Sep. 2017 to Xerox Corporation, discloses computer-implemented methods and systems for automatically summarizing text in a single document. These methods and systems employ part-of-speech (POS) information to provide a continuous summary of text 'on the fly', which is suitable for use with a text-to-speech interface, or small format display, to enable a user to scan rapidly through the document in order to identify specific content of interest for more detailed review.

In contrast to providing summaries of the contents of individual documents, there are applications in which there may be a requirement to provide a concise summary of the contents of multiple related documents. For example, a search on a particular topic may return many documents such that it would be useful to summarize information content relevant to aspects the search topic derived from the multiple documents. In another scenario, the related documents may be user-generated reviews of a particular product or service, whereby a summary of common themes of the reviews relating to one or more aspects of the product or service would be useful to a person without the time or capability to read all of the individual reviews.

Many existing solutions for text summarization employ a rules-based approach. For example, manually derived templates may be developed to match certain keywords and/or patterns in text. The resulting summaries are based on the matching terms, ignoring items not included in the template in order to reduce the quantity of text. A disadvantage of this approach is that building the templates is a time-consuming manual process that must be carried out for each domain of interest, and the resulting summaries can only be as specific as the selection of keywords and patterns included in the templates. Techniques for automated keyword and/or sentence extraction include frequency-based approaches (e.g. using term frequency inverse document frequency, TF-IDF) and semantics-based approaches (e.g. using word/term embeddings). However, while these techniques can identify characteristic terms appearing within documents, they do not generate actual summaries.

A further drawback of computer-generated summaries is that they can appear generic; standardised, unnatural, or 'robotic' in form, whereas it is preferable to provide summaries that are as natural, or 'human-like', as possible.

SUMMARY

The invention addresses the need for automatic text summarization, while avoiding or ameliorating drawbacks and limitations of the prior art such as those described above, by providing computer-implemented methods and systems that apply machine learning techniques and technologies to generate automated summaries based on collections of multiple text documents. Embodiments of the invention firstly apply an abstractive summarisation approach using POS tagging and graph data structures to represent natural language text, thereby deriving a plurality of ranked candidate summary sentences from a plurality of text documents. An extractive approach is then applied, which may employ numerical vector representations of words generated using machine learning techniques to capture semantic content, to identify word sequences within the text documents having similar meaning to one or more of the ranked candidate summary sentences. Advantageously, the abstractive approach enables concise summaries to be provided that reflect the contents of multiple documents, while the extractive approach enables the summaries to be presented in a natural-language form based upon human-composed text extracted from the documents.

Embodiments of the invention therefore satisfy the dual requirements of reducing a potentially large quantity of text in multiple documents to a concise summary, and presenting the summary in natural human language.

In particular, a first aspect of the invention provides a computer-implemented method for summarizing text, comprising: receiving input text data comprising tokens of a plurality of related text documents; processing the input text data to identify a corresponding plurality of sentences; forming one or more topic groups, each comprising a subset of the plurality of sentences selected according to topic-related tokens within each sentence; generating a machine summary of the related text documents by determining part-of-speech (POS) data for each token in the text, wherein the POS data represents a grammatical function of the token in its corresponding sentence, and whereby the tokens are substituted with token/POS pairs; constructing, for each topic group, a graph data structure having a plurality of nodes and connecting edges, wherein each node represents a unique token/POS pair, and sequences of edges represent sequences of token/POS pairs comprising sentences of the corresponding topic group, generating, for each topic group, a plurality of ranked candidate summary sentences based upon subgraphs of the graph data structure having initial and final nodes corresponding with valid sentence start and end token/POS pairs, and composing the machine summary by selecting, for each topic group, at least one representative summary sentence from the ranked candidate summary sentences; generating a natural-language summary corresponding with the machine summary by computing, for each topic group, numerical suitability measures that provide a comparison between the representative summary sentence and sentences of the corresponding topic group, and composing the natural-language summary by selecting, for each topic group, a preferred summary sentence based on the corresponding numerical suitability measures; and obtaining summarized text data of the input text data comprising the natural-language summary.

In embodiments of the invention, each graph data structure may comprise positional reference information associated with each node, which tracks sentences of the corresponding topic group that contain the token/POS pair represented by the node, and the candidate summary sentences may be ranked using a weighting that depends upon the positional reference information of the nodes comprising the corresponding subgraphs. Advantageously, a single representative summary sentence may be selected having a highest-ranking value of the candidate summary sentences.

The numerical suitability measure between the representative summary sentence and sentences of the corresponding topic group may comprise a semantic distance measure computed using numerical vector representations of tokens generated using a machine learning training process configured to capture semantic content in a characteristic of the numerical vector representations. The characteristic of the numerical vector representations may be vector direction, and the semantic distance measure may be cosine similarity.

The numerical suitability measure between the representative summary sentence and sentences of the corresponding topic group may further comprise a vocabulary distance measure based upon the occurrence of shared and distinct tokens between sentences. The vocabulary distance measure may be Jaccard similarity.

Advantageously, by combining a semantic distance measure and a vocabulary distance measure in the numerical suitability measure, a balance may be obtained between semantic similarity, and variation in vocabulary. This is a useful feature of such embodiments of the invention, because a score based on only semantic distance may result in extraction of a sentence that is most similar to the machine-generated summary sentence, whereas a desirable objective is to extract a different, and more naturally-worded, sentence from the original topic group sentences. The preferred summary sentence may be identified as the sentence having a largest value of the numerical compatibility from all compared sentences of the corresponding topic group.

In embodiments of the invention, the method may comprise performing a sentiment analysis on sentences within each one of the plurality of related text documents of the input text data, and discarding sentences and/or text documents that do not satisfy a prescribed sentiment criterion. Advantageously, by limiting the summary to documents or sentences that satisfy a sentiment criterion, the occurrence of contradictory statements in the summarised text data may be reduced or eliminated.

In another aspect, the invention provides a computing system for summarising text comprising: a processor; at least one memory device accessible by the processor; and at least one text data source, wherein the memory device contains a body of program instructions which, when executed by the processor, cause the computing system to implement a method comprising: receiving, from the text data source, input text data comprising tokens of a plurality of related text documents; processing the input text data to identify a corresponding plurality of sentences; forming one or more topic groups, each comprising a subset of the plurality of sentences selected according to topic-related tokens within each sentence; generating a machine summary of the related text documents by determining part-of-speech (POS) data for each token in the text, wherein the FOS data represents a grammatical function of the token in its corresponding sentence, and whereby the tokens are substituted with token/POS pairs; constructing, for each topic group, a graph data structure having a plurality of nodes and connecting edges, wherein each node represents a unique token/POS pair, and sequences of edges represent sequences of token/POS pairs comprising sentences of the corresponding topic group, generating, for each topic group, a plurality of ranked candidate summary sentences based upon subgraphs of the graph data structure having initial and final nodes corresponding with valid sentence start and end token/FOS pairs, and composing the machine summary by selecting, for each topic group, at least one representative summary sentence from the ranked candidate summary sentences; generating a natural-language summary corresponding with the machine summary by computing, for each topic group, numerical suitability measures that provide a comparison between the representative summary sentence and sentences of the corresponding topic group, and composing the natural-language summary by selecting, for each topic group, a preferred summary sentence based on the corresponding numerical suitability measures; and providing summarized text data of the input text data comprising the natural-language summary.

In yet another aspect, the invention provides a computer program product comprising a tangible computer-readable medium having instructions stored thereon which, when executed by a processor implement a method comprising: receiving input text data comprising tokens of a plurality of related text documents; processing the input text data to identify a corresponding plurality of sentences; forming one or more topic groups, each comprising a subset of the plurality of sentences selected according to topic-related tokens within each sentence; generating a machine summary of the related text documents by determining part-of-speech (POS) data for each token in the text, wherein the POS data represents a grammatical function of the token in its corresponding sentence, and whereby the tokens are substituted with token/POS pairs; constructing, for each topic group, a graph data structure having a plurality of nodes and connecting edges, wherein each node represents a unique token/POS pair, and sequences of edges represent sequences of token/POS pairs comprising sentences of the corresponding topic group, generating, for each topic group, a plurality of ranked candidate summary sentences based upon subgraphs of the graph data structure having initial and final nodes corresponding with valid sentence start and end token/POS pairs, and composing the machine summary by selecting, for each topic group, at least one representative summary sentence from the ranked candidate summary sentences; generating a natural-language summary corresponding with the machine summary by computing, for each topic group, numerical suitability measures that provide a comparison between the representative summary sentence and sentences of the corresponding topic group, and composing the natural-language summary by selecting, for each topic group, a preferred summary sentence based on the corresponding numerical suitability measures; and obtaining summarized text data of the input text data comprising the natural-language summary.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features, and wherein:

FIG. 4B shows a pseudocode description of an algorithm for constructing a graph data structure, corresponding with steps in the method illustrated in FIG. 4A;

FIG. 4C shows schematically a graph data structure constructed according to the method illustrated in FIGS. 4A and 4B;

DETAILED DESCRIPTION

Figure 1:
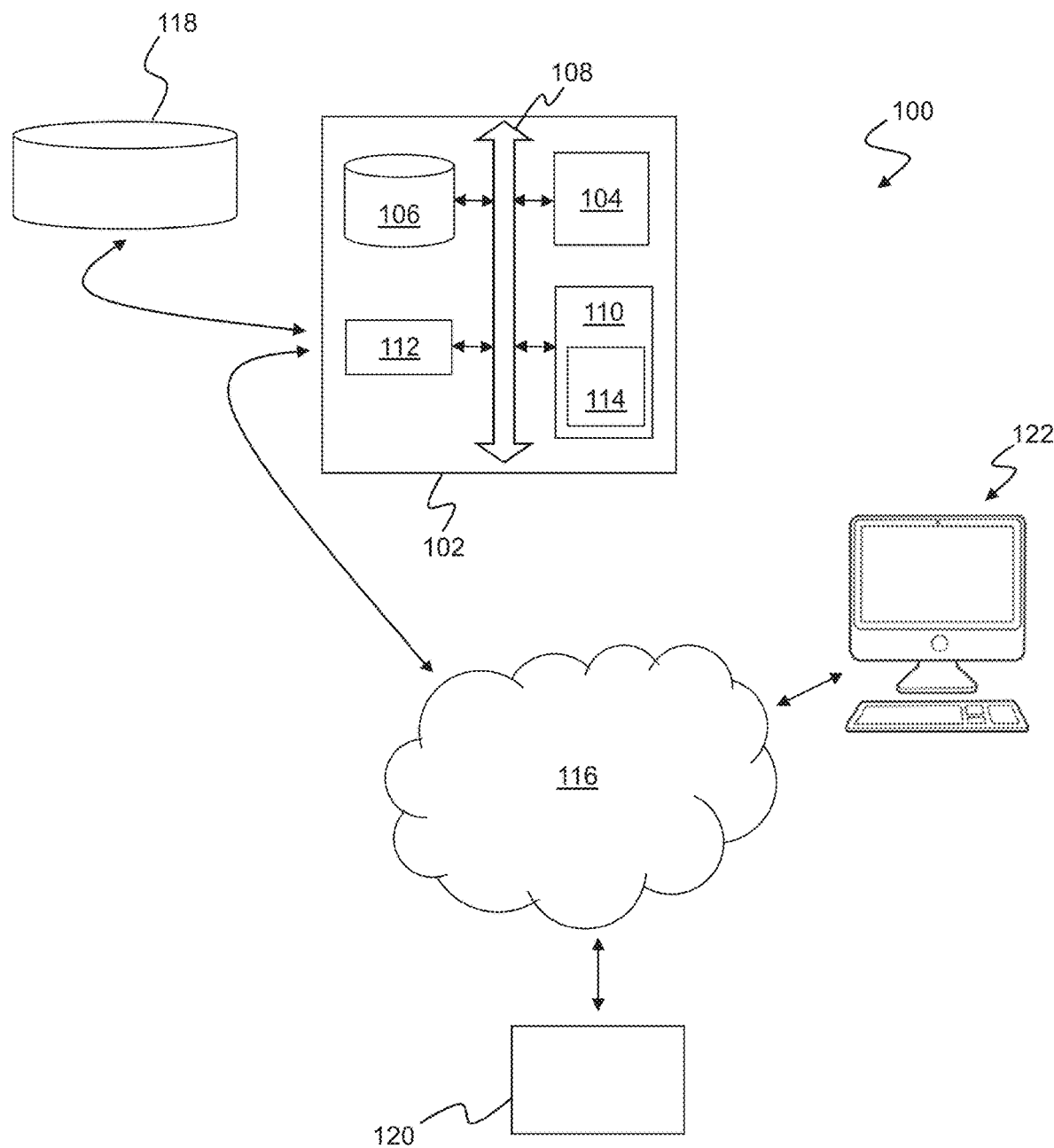
FIG. 1 is a block diagram illustrating an exemplary networked system including a summary server embodying the invention.

FIG. 1 is a block diagram illustrating an exemplary networked system 100 including a summary server 102 embodying the invention. In particular, the summary server 102 comprises a system embodying the invention, which is configured to provide text summarization services in the form of computer-implemented methods that apply machine learning techniques and technologies to generate automated summaries based on collections of multiple text documents.

The summary server 102 may comprise a computer system having a conventional architecture. In particular, the summary server 102, as illustrated, comprises a processor 104. The processor 104 is operably associated with a non-volatile memory/storage device 106, e.g. via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the summary server 102.

In a conventional configuration, the storage device 106 maintains known program and data content relevant to the normal operation of the summary server 102. For example, the storage device 106 may contain operating system programs and data, as well as other executable application software necessary for the intended functions of the summary server 102. The storage device 106 also contains program instructions which, when executed by the processor 104, cause the summary server 102 to perform operations relating to an embodiment of the present invention, such as are described in greater detail below, and with reference to FIGS. 2-5, in particular. In operation, instructions and data held on the storage device 106 are transferred to volatile memory 110 for execution on demand.

The processor 104 is also operably associated with a communications interface 112 in a conventional manner. The communications interface 112 facilitates access to a wide-area data communications network, such as the Internet 116.

In use, the volatile storage 110 contains a corresponding body 114 of program instructions transferred from the storage device 106 and configured to perform processing and other operations embodying features of the present invention. The program instructions 114 comprise a technical contribution to the art developed and configured specifically to implement an embodiment of the invention, over and above well-understood, routine, and conventional activity in the art of automated language processing, as further described below. In particular, processes and algorithms embodying the invention are described with reference to FIGS. 2-5 in sufficient technical detail to enable persons skilled in the art to understand the principles of the invention, and to put those principles into effect by specific programming to develop program code that can be interpreted, compiled, and/or otherwise provided for execution within the body of program instructions 114.

With regard to the preceding overview of the summary server 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms.

Computing systems may include conventional personal computer architectures, or other general-purpose hardware platforms. Software may include open-source and/or commercially available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the terms 'processing unit' and 'module' are used in this specification to refer to any suitable combination of hardware and software configured to perform a particular defined task. Such a processing unit or module may comprise executable code executing at a single location on a single processing device, or may comprise cooperating executable code modules executing in multiple locations and/or on multiple processing devices. For example, in some embodiments of the invention, text pre-processing and summarisation algorithms may be carried out entirely by code executing on a single system, such as the summary server 102, while in other embodiments corresponding processing may be performed in a distributed manner over a plurality of systems.

Software components, e.g. program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C#programming language, the F#programming language, the Visual Basic (i.e. VB.NET) programming language, the C++ programming language, the Go programming language, the Python programming language, the R programming language, the SQL query language, and/or other languages suitable for implementation of applications, including web-based applications, comprising data retrieval and storage, natural language processing (NLP), machine learning, and other algorithms, such as are described below with reference to FIG. 2-5, to generate automated summaries based on collections of multiple text documents. Development and deployment of NLP and machine learning techniques and technologies employed in embodiments of the invention may be supported by the use of frameworks and code libraries such as TensorFlow, PyTorch, Keras, spaCy, Gensim, Natural Language Toolkit (NLTK), SparkNLP, and/or Stanford CoreNLP.

It will, however, be appreciated by skilled persons, based upon the following technical disclosure, that embodiments of the invention involve the implementation of software structures and code that are not regarded as well-understood, routine, or conventional in the art of the art of automated language processing, and that while pre-existing languages, frameworks, platforms, development environments, and code libraries may assist implementation, they require specific configuration and extensive augmentation (i.e. additional code development) in order to realize various benefits and advantages of the invention and implement the specific structures, processing, computations, and algorithms described below, particularly with reference to FIGS. 2-5.

The foregoing examples of languages, environments, and code libraries are not intended to be limiting, and it will be appreciated that any convenient languages, libraries, and development systems may be employed, in accordance with system requirements. The descriptions, block diagrams, flowcharts, pseudocode algorithms, and so forth, presented in this specification are provided, by way of example, to enable those skilled in the arts of software engineering, natural language processing (NLP), and machine learning to understand and appreciate the technical features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media may include volatile and non-volatile, and removable and non-removable, tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. While a computer readable storage medium may not comprise transitory signals per se (e.g. radio waves or other propagating electromagnetic waves, electromagnetic waves propagating through a transmission media such as a waveguide, or electrical signals transmitted through a wire), computer readable program instructions may be downloaded via such transitory signals to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, pseudocode algorithms, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

Returning to the discussion of FIG. 1, the networked system 100 further includes one or more document storage databases, e.g. 118, which are accessible to the summary server 102, e.g. via a direct connection, a local area network (LAN) connections, or a remote connection through the Internet 116. A document storage database 118 may contain a large number of text documents, which may further comprise one or more sets of related text documents. In the context of the present invention, related documents are documents that are connected by common subject matter, whereby it may be desired to generate a concise summary of that subject matter based on the contents of all the related documents in order to reduce the burden on a user, or an automated system (such as a text-to-speech system) of reviewing the full content of a potentially large number of documents. One example of a group of related text documents is a set of documents resulting from a search on a particular subject, in which it is the search query that determines the documents returned from the document storage database 118. Another example of a group of related text documents is a set of reviews of a particular product or service, e.g. a film, TV series, song or album, retail outlet, accommodation provider, transport provider, and so forth.

Additionally, embodiments of the present invention implement a concept of 'topics' within a set of related text documents. In this context, a topic is an identifiable aspect of the subject matter that connects the related documents for which a component of an overall summary can be generated. By way of a concrete example—which will be used throughout the following description, without limitation to the generality of the principles of the invention topics associated with documents relating to reviews of accommodation services may comprise such aspects as 'comfort', 'cleanliness', 'food', 'service standards', 'location', and so forth.

In general, the services provided by the summary server 102 may not be accessed directly by end users, but may more commonly be accessed via third-party service provider servers, e.g. 120. These third-party servers may, in turn, be accessed by end users via terminals, e.g. 122, such as personal computers, or other devices, using web browser or other application software. A concrete example of such an arrangement is an online server provided by a travel booking service provider through which end users are able to search, review, and book accommodation and other travel services. When presenting accommodation options to an end user, the service provider server may be configured to include reviews of accommodation services. Since a large number of user reviews may have been received for some accommodation provider, it may be desirable, alternatively or additionally, to present a concise summary of the full set of reviews. In this case, the travel booking server 120 may access services provided by the summary server 102, e.g. via an application programming interface (API), in order to obtain a concise summary of the available reviews for presentation on the terminal 122 of the end user.

Figure 2:
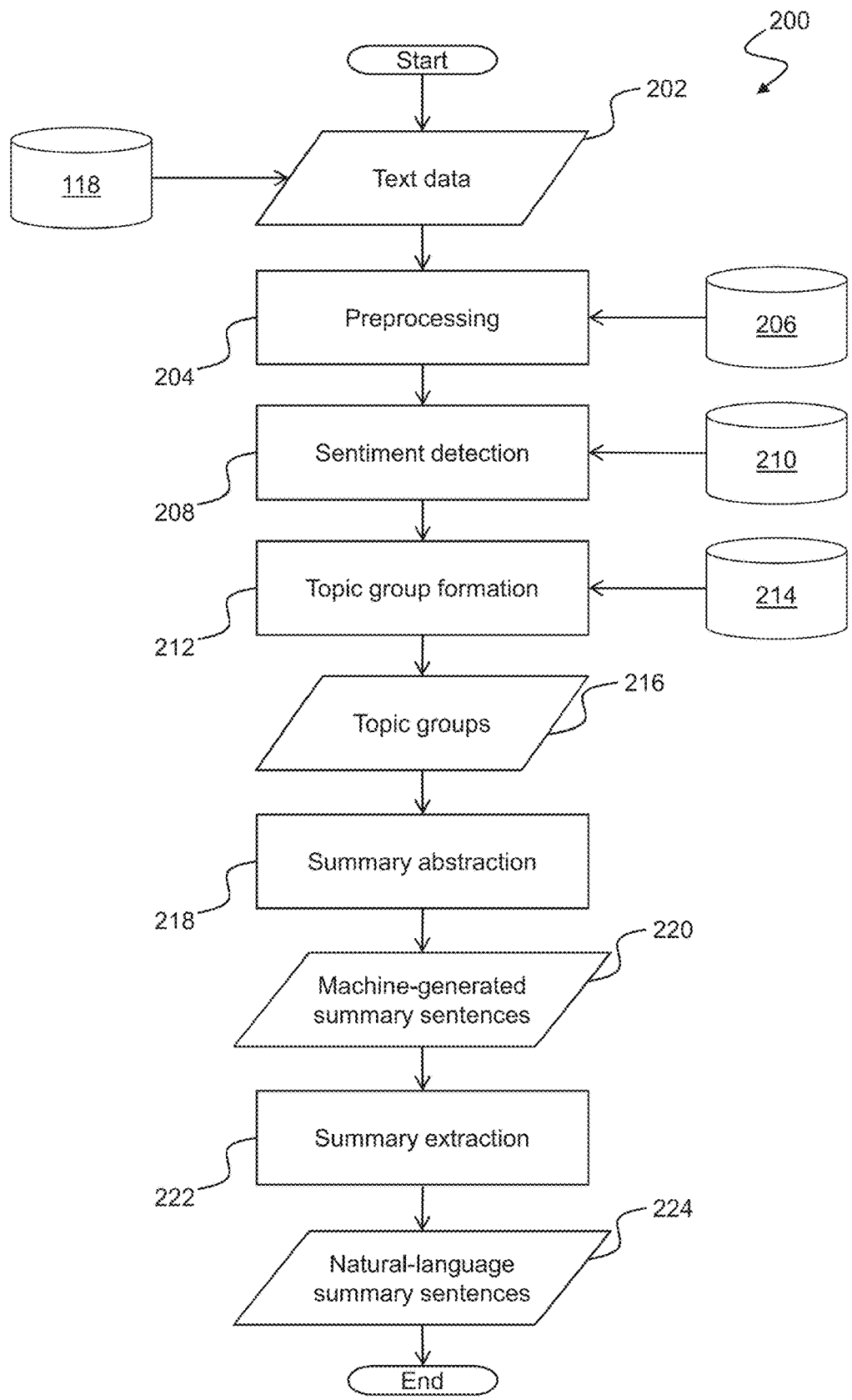
FIG. 2 is a flowchart of a method for summarizing a set of related text documents embodying the invention.

FIG. 2 is a flowchart 200 of a method for summarizing a set of related text documents embodying the invention. The input 202 to the process 200 is a body of text data comprising tokens of a plurality of text documents, e.g. as retrieved from a document database 118. Each token is a sequence of characters from one of the text documents that may be grouped together as a useful semantic unit for processing. Most commonly, a token is a word, i.e. characters delineated by a pair of boundary marks such as spaces or punctuation. However, a token may be a part of a word (e.g. the word "shouldn't" may comprise the tokens "should" and "n't") or a group of words and/or punctuation (e.g. the term 'light year', or the compound adjective 'part-time', may for some purposes be considered single tokens).

At step 204, preprocessing of the input text data 202 may be performed, which may employ a number of natural language (NL) resources 206. The NL resources 206 may be stored in the local storage 106 of the summary server 102, or may be retrieved from a remote database as required. Preprocessing 204 may comprise execution of code modules available in one or more NLP frameworks or libraries, and may further comprise execution of code developed specifically for the purposes of implementing an embodiment of the invention in order to provide required preprocessing and to bind and transfer data between different preprocessing code modules.

Figure 3:
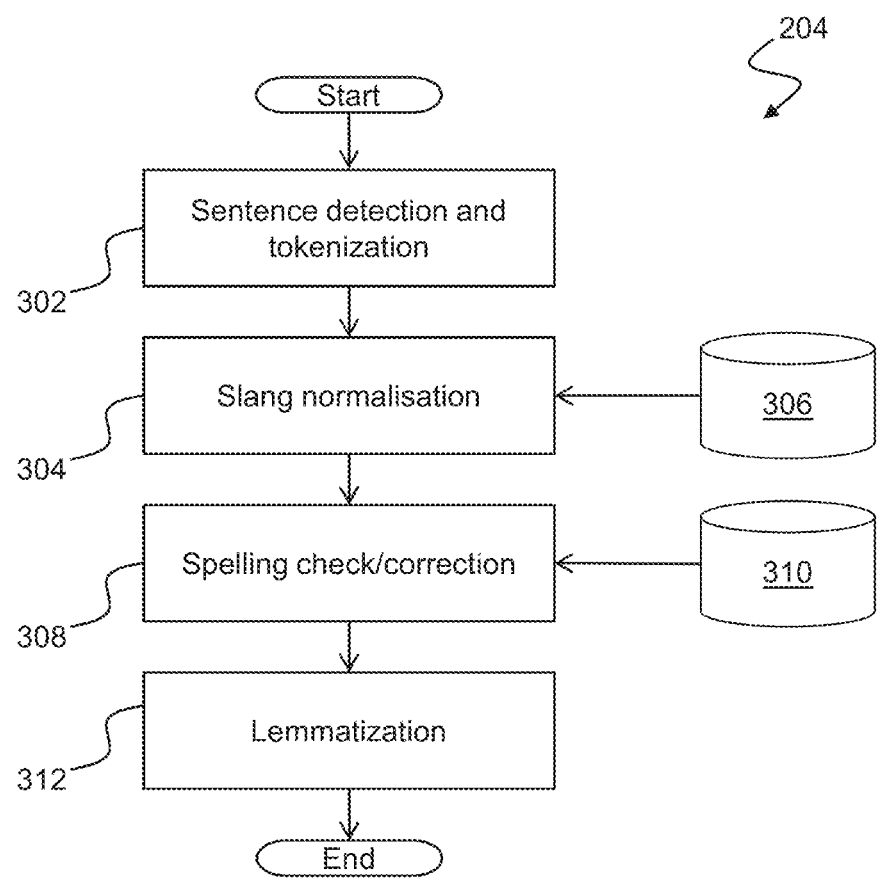
FIG. 3 is a flowchart providing further details of a preprocessing step of the method illustrated in FIG. 2.

In an embodiment of the invention, preprocessing 204 comprises sub-steps of tokenization and sentence detection 302, slang normalisation 304, spellchecking 308, and lemmatisation 312, as illustrated in greater detail in the flowchart shown in FIG. 3. Code modules for sentence detection and tokenisation 302 are provided in a number of NLP libraries, e.g. the 'tokenize' package in the Python NLTK library, the PTBTokenizer class of the Stanford CoreNLP framework, a 'Language' object in the Python spaCy library, or the 'Tokenizer' Annotator Model in the SparkNLP library. Executable code may therefore be implemented to incorporate one or more such modules into the program code 114 embodying the invention. Alternatively, or additionally, a custom tokenizes and/or sentence detector may be implemented based on characteristics of the text documents. For example, in the case of user reviews it has been found to be useful to split sentences on commas (',') and the word 'and', as well as on full stops ('.'), because these tend to divide topics (e.g. a review sentence such as 'the location was great and the price reasonable' actually comprises the two distinct aspects of location and value).

A code module for slang normalisation 304 may employ a slang dictionary 306, e.g. stored with the NL resources 206, which comprises translations from common abbreviations and other slang terms to corresponding 'normal' forms (e.g. 'gr8'→'great', 'fyi'→'for your information'). Similarly, a spellchecking 308 code module may be employed to correct at least the most common misspellings of words, and standardise alternative spellings (e.g. British versus US English) in order to improve consistency within the input text data. As with tokenization and sentence detection, code modules for spellchecking are provided in a number of NLP libraries, generally based upon a corresponding language-specific lexicon or dictionary 310. Spelling correction can be a complex task, and different algorithms generally provide trade-offs between accuracy/quality and computational load. The SparkNLP library, for example, includes a number of Annotator Models for spelling correction, of which the NorvigSweetingModel has been found to provide a reasonable compromise between accuracy and computational requirements in embodiments of the invention.

A further preprocessing sub-step is lemmatisation 312, which refers to the process of reducing inflectional forms, and/or derivationally related forms, of a word to a common base form (e.g. 'eat', 'eating', 'ate'→'eat'). A lemmatiser is an NLP tool that performs a morphological analysis to accurately identify the lemma for each word. Lemmatisers are available in a number of NLP libraries, including NLTK, spaCy, Stanford CoreNLP, and SparkNLP. Executable code may therefore be implemented to incorporate one or more such modules into the program code 114 embodying the invention.

Returning to FIG. 2, at step 208, sentiment detection may be performed on the pre-processed sentences. The purpose of sentiment detection is primarily to determine whether each sentence expresses a positive or negative sentiment. It is therefore of particular interest in the case of summarising reviews and other documents for which sentiment is significant, and where it may therefore be desirable to distinguish between positive and negative content. However, for substantially factual documents, such as general search results, sentiment may not be relevant and the sentiment detection step 208 may be omitted.

Sentiment detection 208 may employ stored resources 210, such as a lexicon and/or a sentiment model. A relatively simple sentiment detector may be implemented that employs a lexicon that maps lemmatised tokens of a sentence to value forms which are accumulated to compute an overall sentiment score for the sentence. The value forms comprise four types: a positive score value (e.g. for words such as 'good', or 'excellent'); a negative score value (e.g. for words such as 'bad', 'worse', or 'rude'); a 'revert' form (for reversing the score in the event that negating words such as 'not' are encountered); and an 'increment' form (for boosting the score when words such as 'very' are encountered). In embodiments of the invention, the lexicon may be provided as a stored resource 210, and this scoring algorithm implemented as executable instructions within the program code 114. Alternative techniques for sentiment detection include supervised machine learning approaches, in which a sentiment detection model that has been trained using a corpus of labelled sentences may be used to generate a sentiment value. In some embodiments, therefore, such a model may be trained and provided as a stored resource 210. Some NLP libraries, e.g. Stanford CoreNLP, provide sentiment analysis models, and executable code may therefore be implemented to incorporate one or more such models into the program code 114 embodying the invention.

Step 212 is topic group formation, which consists of forming one or more topic groups, each comprising a subset of the identified sentences selected according to topic-related tokens within each sentence. More specifically; the input to the topic group formation step 212 is the set of pre-processed sentences, each of which is tokenised and normalised, and may optionally have an assigned sentiment score. Each sentence is associated with one or more corresponding topics based upon a topic vocabulary 214, which comprises a set of mappings between tokens and topic identifiers. The topic vocabulary 214 may be specific to the service provided by the summary server 102. In the exemplary case of providing summaries of accommodation reviews; topic identifiers may include such aspects as 'location' (e.g. 'airport', 'beach', 'shops'), 'price/value' (e.g. 'cheap', 'expensive'), 'food' (e.g. 'restaurant', 'breakfast'), 'service' (e.g. 'friendly', 'efficient'), and so forth. Accordingly, executable instructions may be implemented within the program code 114 that are configured to match tokens in the preprocessed sentences with topic identifiers in the vocabulary 214 in order to associate one or more topics with each sentence.

In embodiments employing sentiment detection, a further sub-step of topic group formation may comprise aggregating sentiment scores for each topic within each document. For example, in the case where the documents are accommodation reviews, it may be desirable to determine whether a review is positive or negative overall, in relation to different aspects of the accommodation provider such as location or value. The aggregation process can comprise adding the individual sentence sentiment scores for each topic identifier to produce a total score, and then scaling the total score for each topic to within a fixed range, e.g. (−1; 1), using a nonlinear/saturating scaling function. As will be appreciated, a number of suitable scaling functions are available. One such function is $f(x)$=tanh x. An alternative scaling function is given by:

$$f(x) = \begin{cases} e^x - 1 & x \leq 0 \\ 1 - e^{-x} & x > 0 \end{cases}$$

A set of output topic groups 216 is formed by selection of topic identifiers and associated sentences. In embodiments employing sentiment detection, a prescribed sentiment criterion may be applied to determine whether to retain or discard sentences and/or documents based on the criterion. For example, it may be desirable to summarise text documents and/or topics based only upon content representing either positive or negative sentiments, in order to avoid contradictions that may otherwise arise. In the exemplary case of providing summaries of user reviews, it is well-known that individual reviewers may have contrary experiences and opinions, and summaries that simultaneously reflect opposing views may therefore be confusing and of reduced value. Summarising only positive reviews enables the positive qualities of a product or service to be emphasised, e.g. to potential customers. Conversely, summarising only negative reviews enables sources of customer dissatisfaction to be emphasised, e.g. to providers of goods/services who may wish to use this feedback to identify areas for improvement.

Executable instructions may accordingly be implemented within the program code 114 that are configured to implement the above methods in order to form a set of topic groups 216, each comprising a topic identifier and an associated subset of sentences selected according to topic-related tokens within each sentence, and optionally excluding sentences that have been discarded that do not satisfy a prescribed sentiment criterion.

In the remaining steps shown in the flowchart 200, embodiments of the invention firstly implement a summary abstraction process 218, which uses part-of-speech (POS) tagging and graph data structures to represent natural language text, thereby deriving a plurality of machine-generated candidate summary sentences from each topic group 216. A summary extraction process 222 is then applied, which may employ numerical vector representations of words generated using machine learning techniques to capture semantic content, to identify word sequences within the text documents having similar meaning to one or more of the candidate summary sentences 220. Natural language summary sentences 224 corresponding with the machine-generated sentences are thereby identified for incorporation in output summarised text data. Advantageously, the abstractive step 218 enables concise summaries 220 to be provided that reflect the contents of multiple documents. However, while these machine-generated summary sentences may seem 'robotic', generic, or monotonous (as with some prior art rule-based approaches), the subsequent extractive step 222 has the particular technical benefit of providing corresponding summary sentences having a natural-language form based upon human-composed text extracted from the documents.

Further details of the abstractive step 218 are described below with reference to FIGS. 4A, 4B, and 4C, while details of the extractive step 222 are described with reference to FIG. 5. It will be appreciated that an embodiment of the invention comprises program code that is developed, and incorporated into the body of program instructions 114, such that, when executed by the processor 104, the instructions implement the methods, algorithms, and computations described as follows with reference to FIGS. 4A, 4B, 4C, and 5.

Figure 4A:
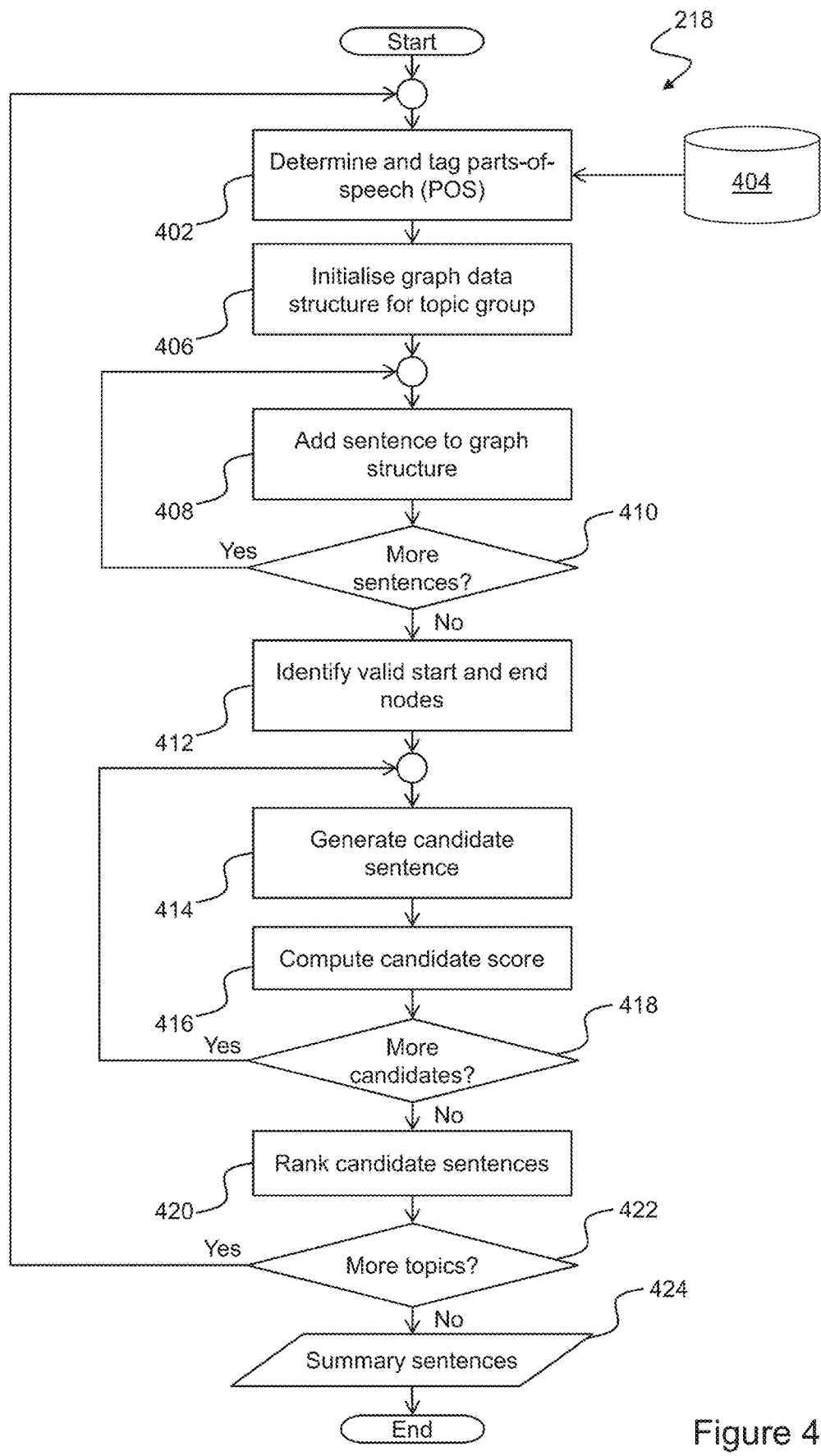
FIG. 4A is a flowchart of a method of performing an abstractive step of the method illustrated in FIG. 2.

FIG. 4A is a flowchart of a method of performing the abstractive step 218 embodying the invention. In the first part of this method a graph data structure is constructed for each topic group that has a plurality of nodes and connecting edges, in which each node represents a unique pair comprising a token tagged with a corresponding POS. Sequences of edges represent sequences of token/POS pairs comprising sentences of the corresponding topic group.

A pseudocode description of an algorithm 426 for constructing the graph data structure for a topic group comprising a set S of sentences is shown in FIG. 4B, which is based upon the disclosure in Kavita Ganesan, ChengXiang Zhai and Jiawei Han, 'Opinosis: A Graph-Based Approach to Abstractive Summarization of Highly Redundant Opinions', *Proceedings of the 23rd International Conference on Computational Linguistics*, 2010.

The algorithm 426 requires that each token $w_j$ of each input sentence $s_i$ be tagged with its corresponding part-of-speech to form a token/POS pair. Accordingly, at step 402 POS data is determined for each token of the sentences of the current topic group, and used to tag the tokens such that they are substituted with token/POS pairs used by the algorithm 428. Modules for performing POS tagging are available, for example, in a number of NLP libraries, including NLTK, spaCy, Stanford CoreNLP, and SparkNLP. Such modules typically employ a language model 404, such as a neural network model that has been trained using tagged samples of text in a target language. Executable code may therefore be implemented to incorporate one or more such modules into the program code 114 embodying the invention.

At step 406 a new empty graph data structure is created for the current topic group. Subsequently, at steps 408 and 410, sentences in the current topic group are processed in accordance with the outer loop of the algorithm 426. In particular, step 408 represents the processing 428 within the loop that updates the graph data structure for each sentence, while step 410 is a check to determine whether there are further sentences for processing and, if so, to return control to the update step 408. The processing 428 updates the graph data structure such that each unique token/POS pair $w_j$ comprises a node at which a list of Positional Reference Information (PRI) structures is maintained. Each PRI structure contains a pair of values {SID:PID}, where SID is an identifier of the sentence i in which the token occurs, and PID is an identifier j of the position of the token within the sentence.

By way of further illustration, FIG. 4C shows schematically a graph data structure 430 constructed from four example sentences 432 of a 'cleanliness' topic group, according to the algorithm 426, Each node of the graph 430, e.g. nodes 434, 436, 438, is labelled with its corresponding unique token/POS pair, and the associated list of PRI structures resulting from processing of the sentences 432. Thus, for example, the node 434 corresponds with the determiner 'the' (i.e. 'the/DT'), which is the first token of sentences 2, 3, and 4; the node 436 corresponds with the past tense verb 'was' (i.e. 'was/VBD'). which is the third token of sentences 2 and 3; and the node 438 corresponds with the end-of-sentence (EOS) token (labelled './.'), which is the final token of all four sentences (i.e. token 5 of sentences 1 and 2, token 6 of sentence 3 and token 7 of sentence 4). It should be noted that the POS tag abbreviations employed in this description correspond with those of the Penn Treebank Project.

Returning to FIG. 4A, the graph data structure that has been constructed for the current topic group is used to generate at least one corresponding abstractive summary sentence. The algorithm for generating such a sentence involves identifying all valid paths within the graph, being those paths having valid initial and final nodes (i.e. corresponding with tokens that comprise legitimate beginnings and endings of sentences), and passing through any series of intermediate nodes having a sequence of POS tags that satisfy predetermined syntax rules. Specifically, at step 412 all valid initial and final nodes are identified. According to an embodiment of the invention, a valid start node (VSN) must have a POS tag that can start a sentence (e.g. determiner DT but not punctuation), and furthermore must have an average PID value that is below a predetermined threshold $\sigma_{VSN}$ which limits the selection to nodes that tend to occur early in the input sentences. Furthermore, according to an embodiment of the invention valid end nodes (VENs) are limited to appropriate punctuation marks (e.g. a full stop or comma). In some embodiments, however, additional rules may be implemented to identify VENs, such as coordinating conjunctions such as 'but' or 'yet'.

At steps 414-418, all valid sequences linking pairs of the VSNs and VENs are identified. These sequences can be considered as candidate sentences for summarising the content of the current topic group. In particular, at step 141 a candidate sentence is identified by selecting a VSN from the graph, and performing a depth first traversal of the graph data structure in search of a previously unidentified sequence of nodes that satisfies appropriate syntax rules in the relevant language. For example, in English, the sequence DT NN V (RB) JJ (i.e. determiner, noun, verb, optional adverb, adjective) is a valid sequence whereas NN JJ NN JJ V is not. At step 416, a ranking score is computed for the resulting candidate sentence. Decision step 418 determines whether the search for candidate sentences is complete (i.e. the depth first traversal of the graph is complete, and there are no further VSNs) and, if not, then control returns to step 414 to continue the search.

In an exemplary embodiment of the invention, the ranking score is computed at step 416 based upon a path redundancy measure. For a valid path (i.e. candidate sentence) p= $\{w_1, \ldots, w_n\}$, the path redundancy r of p is defined by the number of overlapping sentences covered by the path:

$$r(p) = |PRI_{w_1 \cap \ldots \cap PRI w_n}|$$

where $\cap$ is the intersection between two sets of SIDs such that the discrepancy between the corresponding PIDs is not greater than a predetermined value $\sigma_{gap}$, which is selected to account for small variations between input sentences that do not significantly change their meaning. The ranking score s of a path p is computed according to:

$$s(p) = \frac{1}{|p|} \sum_{i=1}^{n} r(w_1, \ldots, w_i) \log|w_1, w_i|$$

where the logarithmic component is included to accord additional weighting to longer paths, which are generally less redundant than shorter paths.

At step 410, the candidate sentences are sorted according to their ranking scores, such that the top-scoring path(s) can be identified. A check 422 is then conducted to determine whether there are further topic groups to be processed and, if so, then control returns to step 402. Otherwise, an output set of abstractive summary sentences 424 is generated, and the process 418 terminates. In an exemplary embodiment of the invention, the set of abstractive summary sentences 424 comprises the first-ranked candidate sentence (i.e. the top-scoring path) within each topic group.

While the summaries resulting from the above-described process are meaningful, and generally summarise the content of each topic group, they have been found typically to comprise overly generic and unnatural vocabulary. Accordingly, an extractive procedure 222 shown in the flowchart of FIG. 5 is employed in embodiments of the invention to provide improved natural language output. It will be appreciated that an embodiment of the invention comprises program code that is developed, and incorporated into the body of program instructions 114, such that, when executed by the processor 104, the instructions implement the methods, algorithms, and computations described as follows with reference to FIG. 5.

In an exemplary embodiment of the invention, the extractive procedure 222 takes as input the machine-generated summary sentences 424, comprising one sentence for each identified topic group, and loops through each sentence in turn. Thus, at step 502, a single topic summary sentence is selected for processing. An inner loop comprising steps 504, 506, 510, and 512 then processes the corresponding original topic group sentences 216 to assess the suitability of each sentence for extraction as a substitute for the machine-generated topic summary sentence, by computing a numerical suitability measure for each original sentence. In the exemplary embodiment, at step 504 a topic group sentence is retrieved. At step 506, a measure of semantic distance between the retrieved sentence and the topic summary sentence is computed based upon pre-trained word embeddings and/or language model 508. At step 510, a measure of vocabulary distance between the retrieved sentence and the topic summary sentence is computed. At step 512, a numerical suitability measure is computed, based upon the semantic distance measure and the vocabulary distance measure. A check 514 is performed to determine whether there are further original topic group sentences within the data set 216 for processing and, if so, control returns to step 504. Otherwise, the processed topic group sentences are sorted according to their associated numerical suitability scores, and the top-ranked sentence is selected 516 as a preferred summary sentence for the topic group.

In embodiments of the invention; the semantic distance measure may be computed based upon numerical vector representations which capture semantic content of the machine-generated topic summary sentence and the original sentence within a multi-dimensional vector space. Suitable fixed vector representations of tokens (i.e. words or phrases), which are commonly termed 'embeddings', can be trained using models such as word2vec (originally developed at Google) or GloVe (originally developed at Stanford University). Suitable vector representations of words, phrases, and/or sentences may alternatively be obtained using trained language models such as BERT (Bidirectional Encoder Representations from Transformers), GPT (Generative Pre-Training), or ELMo (Embeddings from Language Models). Pre-trained embeddings and/or language models may be stored 508 and used at step 506 to obtain numerical vector representations of sentences suitable for computing the semantic distance measure. Examples of pre-trained embeddings and models are publicly available, however in particular applications of embodiments of the present invention it may be advantageous to train embeddings and/or models using application-specific language samples. In the case of accommodation reviews, for example, word embeddings and/or language models may be trained using samples of accommodation reviews, whereby the resulting embeddings and/or models will comprise a more accurate representation of language used in this particular context. The resulting trained embeddings and/or models may then be stored 508 for use at step 506.

In an exemplary embodiment of the invention, word2vec embeddings are employed to obtain vector representations of tokens within each sentence, and sentence vectors are computed by averaging the token vectors while excluding tokens with low semantic content, as defined by a 'stop-words' set. In the case of word2vec embeddings it is known that semantic information is encoded in the directions of the vectors, and thus a suitable semantic distance measure between two sentences $s_1$ and $s_2$ is the cosine similarity between corresponding sentence vectors $v_1$ and $v_2$:

$$\sigma_{semantic}(s_1, s_2) = \frac{v_1 \cdot v_2}{\|v_1\|\|v_2\|}$$

A suitability score based on only semantic distance would result in extraction of a sentence that is most similar to the machine-generated summary sentence, which is clearly undesirable since the aim of the extractive step is to extract a different, and more naturally-worded, sentence from the original topic group sentences. Embodiments of the invention avoid this by incorporating a measure of vocabulary distance into the numerical suitability measure. A useful measure of vocabulary distance is Jaccard similarity, defined as:

$$\sigma_{vocabulary}(s_1, s_2) = J(s_1, s_2) = \frac{S_1 \cap S_2}{S_1 \cup S_2}$$

where $S_1$ and $S_2$ are the sets of distinct tokens in sentences $s_1$ and $s_2$ excluding any tokens defined in the stopwords set. The Jaccard similarity thus has a value between 0.0 and 1.0, with larger values corresponding with pairs of sentences with a larger proportion of tokens in common.

In order to obtain a balance between semantic similarity, and variation in vocabulary, embodiments of the invention thus compute the numerical sentence suitability measure at step 512 according to:

$$\sigma(s_1, s_2) = \frac{\sigma_{semantic}(s_1, s_2)}{1 + \sigma_{vocabulary}(s_1, s_2)}$$

Figure 5:
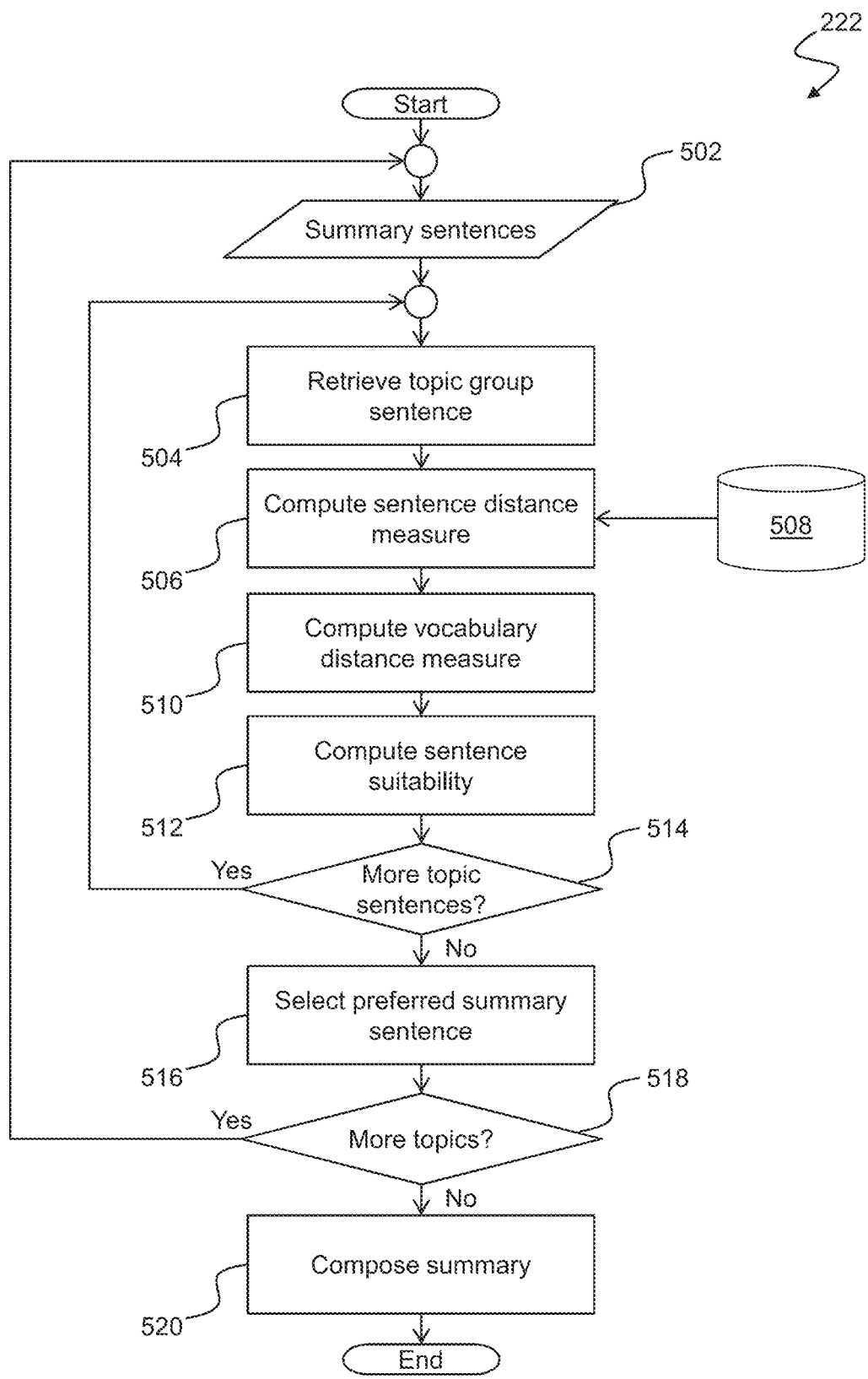
FIG. 5 is a flowchart of a method of performing an extractive step of the method illustrated in FIG. 2.

Returning to the flowchart in FIG. 5, after selecting the highest-scoring sentence for extraction at step 516, a check 518 is performed to determine whether there are further topics for processing and, if so, control returns to step 502. Otherwise, at step 520, a summary is composed comprising the extracted sentences in place of the machine-generated sentences.

Figure 6A:
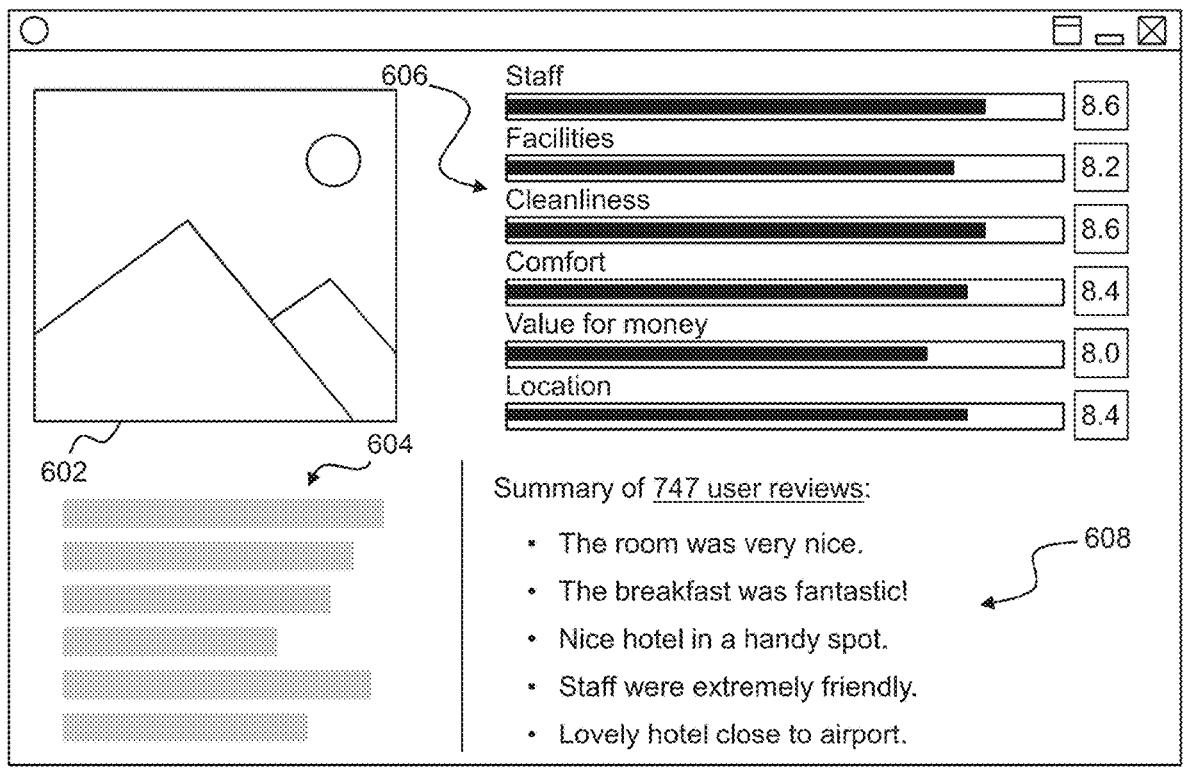
FIGS. 6A and 6B show exemplary schematic diagrams of a graphical user interface of a web-based service incorporating content provided by a summary server embodying the invention.
Figure 6B:
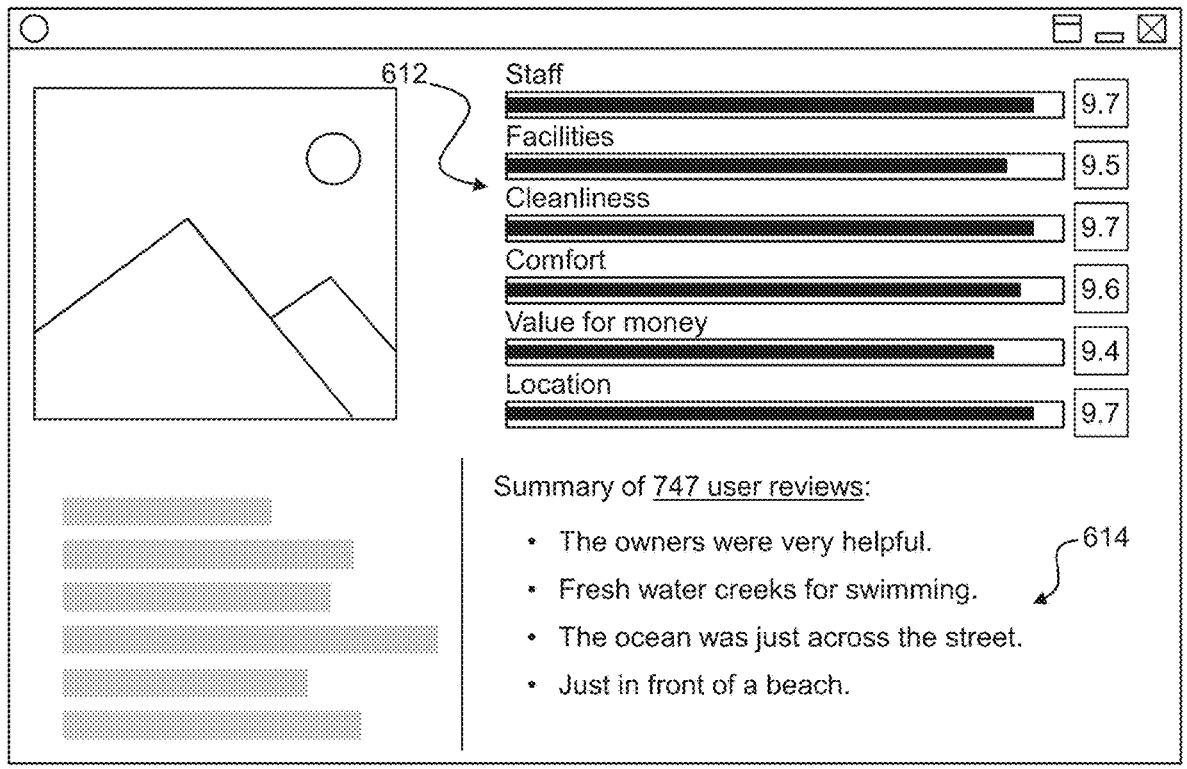

FIGS. 6A and 6B show exemplary schematic diagrams of a graphical user interface of a web-based service incorporating content provided by a summary server 102 embodying the invention. For the purposes of this example, the web-based service is an accommodation booking provider, which provides a booking server, e.g. 120, that may be accessed from an end-user terminal, e.g. 122, either via web browser software or a dedicated application. The interface 600 shown in FIG. 6A comprises a profile page for a particular accommodation provider, and includes an image 602, along with information about the accommodation 604. The profile page 600 further includes user review information, which comprises a group of scores 606, and a review summary 608.

The scores 606 may be obtained by averaging scores or ratings provided by individual users, and relate to various aspects of user experience of the accommodation, such as staff, facilities, cleanliness, comfort, value, and location. As will be appreciated, such scores are a useful indicator of the general qualities of the service provider, however they lack detail that may be necessary for a user to make a booking decision based on their own individual requirements and priorities. That is, while high scores are indicative of positive experiences by prior users, they do not reveal the reasons for those users' opinions. Since different individuals, and different types of traveller, may have different interests, requirements, and priorities, something which is a strongly positive characteristic for one user may be less so for another. A user may therefore wish to read individual reviews, in order to better understand the specific reasons for the average scores 606 that have been awarded. However, since the number of reviews may be very large, and may contain a range of different opinions and information, this may not be practical. Accordingly, it is desirable to provide a useful summary 608 of the reviews that captures the main reasons for the awarded scores.

In order to provide the summary 608, the booking server 120 access the services provided by the summary server 102. The summary server 102 in this example is able to retrieve reviews from the document storage 118, and execute the processing described above with reference to FIG. 2-5 to generate a set of summary sentences from the reviews of the subject accommodation provider. The summary server 102 may provide an API for this purpose, enabling the booking server 120 to issue a request identifying the relevant documents to be summarised, along with other relevant parameters, such as any sentiment criterion to be applied when generating the summary, and to receive the resulting set of summary sentences in response.

The summary sentences are able to capture specific aspects of the reviews that are not apparent from the average scores alone. In the case of the exemplary interface 600, the review summary 608 reveals that a reason for the high average score awarded for 'location' is the proximity of the accommodation location to an airport. While this may be important for a business traveller, it may be less desirable for a different type of traveller, such as a recreational visitor. In the further exemplary interface 610 shown in FIG. 6B, an alternative accommodation profile page also shows high scores 612 on a range of characteristics, including location. In this case, however, the review summary 614 reveals that the reason for the high average score awarded for 'location' is proximity to a beach and fresh-water creeks. These characteristics may be important to recreational visitors interested in water-based activities, but are unlikely to be a high priority for a business traveller, or a recreational traveller with more interest in land-based activities such as hiking.

It should be appreciated that in both examples 600, 610, the summary service reduces the amount of text that must be read by the user in order to obtain an overview of the content from many hundreds of reviews, down to a small number of summary sentences 608, 612. This significantly reduces the burden on the user, and thus represents a substantial improvement in the utility of the user interface. Furthermore, the summaries 608, 612 are sufficiently concise as to be comfortably displayed and read on a small display device, such as the screen of a smartphone. They are also sufficiently concise as to be read by assistive technology, such as a text-to-speech interface, improving accessibility of the information provided by the accommodation booking server 120 to a range of users requiring, or choosing, to employ such technology.

From the foregoing, it can be understood that embodiments of the present invention provide computer systems configured to generate summaries of input text data using a combination of abstractive summarisation to produce machine-generated summary sentences, with an extractive approach that improves upon the machine-generated sentences by selecting corresponding human-written sentences to produce summaries having enhanced qualities of natural language. An exemplary application of this technology, in presenting user reviews of accommodation providers, has been illustrated, however it will be appreciated that embodiments of the invention may be employed more widely. For example, a similar approach may be applied to reviews of other products and services, given that almost all online providers include and encourage user reviews. Furthermore, it has been noted that the ability of embodiments of the invention to assess sentiment facilitates suppression of presentation of contradictory statements in summaries. While this facility may be employed to summarise reviews with positive sentiments for the purposes of promoting products and services, it may alternatively be used to summarise reviews having negative sentiments, for example in order to provide feedback to providers of goods or services on areas of potential improvement. In either case, technology embodying the invention can significantly reduce the burden on the user—whether customer or service provider—by reducing a large number of reviews to a concise set of summary sentences. Embodiments of the invention are also not limited to summarising reviews, and may be used to provide concise summaries of other collections of related documents, such as documents retrieved from database or Internet search queries.

It will therefore be appreciated that the described embodiments are provided by way of example, for the purpose of teaching the general features and principles of the invention, but should not be understood as limiting the scope of the invention, which is as defined in the appended claims.

The invention claimed is:

1. A computer-implemented method for summarising text, comprising:
   identifying, based on a search query, a plurality of text documents;
   obtaining a plurality of input sentences defining the text documents, the input sentences comprising respective sets of tokens;
   forming a plurality of topic groups comprising respective subsets of the input sentences according to a predetermined mapping between the tokens and topic identifiers;
   executing a natural language processing module employing a language model trained using tagged samples of text in a target language, to determine, for each token of the input sentences, part-of-speech (POS) data representing a grammatical function of the token in its corresponding input sentence;
   substituting each token with a token/POS pair based on the POS data determined via execution of the model;
   for each topic group:
      (i) constructing a graph data structure having a plurality of nodes representing unique token/POS pairs, and edges connecting the nodes in sequences corresponding to the input sentences of the corresponding topic group,
(ii) generating a plurality of ranked candidate summary sentences based upon subgraphs of the graph data structure having initial and final nodes representing valid sentence start and end token/POS pairs, and
(iii) selecting the top-ranked candidate summary sentence;
(iv) computing a numerical suitability measure for each input sentence in the topic group based on comparisons between the top-ranked candidate summary sentence, and the input sentences, and
(v) selecting, as a natural-language summary for the topic group, a preferred one of the input sentences, based on the numerical suitability measures; and
returning, in response to the search query, a summary of the plurality of text documents comprising the natural-language summary for each topic group.

2. The method of claim 1 wherein each graph data structure comprises positional reference information associated with each node, which tracks input sentences of the corresponding topic group that contain the token/POS pair represented by the node, and the candidate summary sentences are ranked using a weighting that depends upon the positional reference information of the nodes comprising the corresponding subgraphs.

3. The method of claim 1 wherein the numerical suitability measure between the top-ranked candidate summary sentence and the input sentences of the corresponding topic group comprises a semantic distance measure computed using numerical vector representations of tokens generated using a machine learning training process configured to capture semantic content in a characteristic of the numerical vector representations.

4. The method of claim 3 wherein the characteristic of the numerical vector representations is vector direction, and the semantic distance measure is cosine similarity.

5. The method of claim 3 wherein the numerical suitability measure between the top-ranked candidate summary sentence and the input sentences of the corresponding topic group further comprises a vocabulary distance measure based upon the occurrence of shared and distinct tokens between sentences.

6. The method of claim 5 wherein the vocabulary distance measure is Jaccard similarity.

7. The method of claim 5 or claim 6 wherein the numerical suitability measure is computed according to:

$$\sigma(s_1, s_2) = \frac{\sigma_{semantic}(s_1, s_2)}{1 + \sigma_{vocabulary}(s_1, s_2)}$$

where $(s_1, s_2)$ represent first and second sentences, $\sigma_{semantic}(s_1, s_2)$ is the semantic distance measure, and $\sigma_{vocabuary}(s_1, s_2)$ is the vocabulary distance measure.

8. The method of claim 7 wherein, for each topic group, the preferred one of the input sentences is identified having a largest value of the numerical suitability from all compared sentences of the corresponding topic group.

9. The method of claim 1, further comprising performing a sentiment analysis on the input sentences within each one of the plurality of related text documents of the input text data, and discarding sentences and/or text documents that do not satisfy a prescribed sentiment criterion.

10. A computing system for summarising text comprising:
at least one memory device;
at least one text data source; and
a processor configured to:
identify, based on a search query, a plurality of text documents;
obtain a plurality of input sentences defining the text documents, the input sentences comprising respective sets of tokens;
form a plurality of topic groups comprising respective subsets of the input sentences according to a predetermined mapping between the tokens and topic identifiers;
execute a natural language processing module employing a language model trained using tagged samples of text in a target language, to determine, for each token of the input sentences, part-of-speech (POS) data representing a grammatical function of the token in its corresponding input sentence;
substitute each token with a token/POS pair based on the POS data determined via execution of the model;
for each topic group:
(i) construct a graph data structure having a plurality of nodes representing unique token/POS pairs, and edges connecting the nodes in sequences corresponding to the input sentences of the corresponding topic group,
(ii) generate a plurality of ranked candidate summary sentences based upon subgraphs of the graph data structure having initial and final nodes representing valid sentence start and end token/POS pairs, and
(iii) select the top-ranked candidate summary sentence;
(iv) compute a numerical suitability measure for each input sentence in the topic group based on comparisons between the top-ranked candidate summary sentence, and the input sentences, and
(v) select, as a natural-language summary for the topic group, a preferred one of the input sentences, based on the numerical suitability measures; and
return, in response to the search query, a summary of the plurality of text documents comprising the natural-language summary for each topic group.

11. The system of claim 10 wherein the numerical suitability measure between the top-ranked candidate summary sentence and the input sentences of the corresponding topic group comprises:
a semantic distance measure computed using numerical vector representations of tokens generated using a machine learning training process configured to capture semantic content in a characteristic of the numerical vector representations; and
a vocabulary distance measure based upon the occurrence of shared and distinct tokens between sentences.

12. The system of claim 11 wherein the numerical suitability measure is computed according to:

$$\sigma(s_1, s_2) = \frac{\sigma_{semantic}(s_1, s_2)}{1 + \sigma_{vocabulary}(s_1, s_2)}$$

where $(s_1, s_2)$ represent first and second sentences, $\sigma_{semantic}(s_1, s_2)$ is the semantic distance measure, and $\sigma_{vocabuary}(s_1, s_2)$ is the vocabulary distance measure.

13. The system of claim 10, further comprising performing a sentiment analysis on sentences within each one of the plurality of related text documents of the input text data, and discarding sentences and/or text documents that do not satisfy a prescribed sentiment criterion.

14. A non-transitory computer-readable medium having instructions stored thereon which, when executed by a processor, configure the processor to:
- identify, based on a search query, a plurality of related text documents;
- obtain a plurality of input sentences defining the text documents, the input sentences comprising respective sets of tokens;
- form a plurality of topic group comprising respective subsets of the input sentences according to a predetermined mapping between the tokens and topic identifiers;
- execute a natural language processing module employing a language model trained using tagged samples of text in a target language, to determine, for each token of the input sentences, part-of-speech (POS) data representing a grammatical function of the token in its corresponding input sentence;
- substitute each token with a token/POS pair based on the POS data determined via execution of the model;
- for each topic group:
  - (i) construct a graph data structure having a plurality of nodes representing unique token/POS pairs, and edges connecting the nodes in sequences corresponding to the input sentences of the corresponding topic group,
  - (ii) generate a plurality of ranked candidate summary sentences based upon subgraphs of the graph data structure having initial and final nodes representing valid sentence start and end token/POS pairs, and
  - (iii) select the top-ranked candidate summary sentence;
  - (iv) compute a numerical suitability measure for each input sentence in the topic group based on comparisons between the top-ranked candidate summary sentence, and the input sentences, and
  - (v) select, as a natural-language summary for the topic group, a preferred one of the input sentences, based on the numerical suitability measures; and
- return, in response to the search query, a summary of the plurality of text documents comprising the natural-language summary for each topic group.

* * * * *